US012636587B2

(12) United States Patent
Im et al.

(10) Patent No.: US 12,636,587 B2
(45) Date of Patent: May 26, 2026

(54) GYRO DROP APPARATUS AND METHOD OF CONTROLLING THE SAME

(71) Applicant: NATIONAL DISASTER MANAGEMENT RESEARCH INSTITUTE, Ulsan (KR)

(72) Inventors: Sujung Im, Ulsan (KR); Yuna Kim, Ulsan (KR); Keumho Oh, Goyang-si (KR)

(73) Assignee: NATIONAL DISASTER MANAGEMENT RESEARCH INSTITUTE, Ulsan (KR)

( * ) Notice: Subject to any disclaimer, the term of this patent is extended or adjusted under 35 U.S.C. 154(b) by 710 days.

(21) Appl. No.: 18/072,281

(22) Filed: Nov. 30, 2022

(65) Prior Publication Data

US 2024/0123363 A1      Apr. 18, 2024

(30) Foreign Application Priority Data

Oct. 13, 2022    (KR) ......................... 10-2022-0131038

(51) Int. Cl.
*A63G 31/00*          (2006.01)
*F16F 9/04*          (2006.01)
(52) U.S. Cl.
CPC ................ *A63G 31/00* (2013.01); *F16F 9/04* (2013.01); *A63G 2031/002* (2013.01)
(58) Field of Classification Search
CPC .............. A63G 31/00; A63G 2031/002; B60R 2021/0097; B60R 21/00

(Continued)

(56) References Cited

U.S. PATENT DOCUMENTS 2,229,201 A *  1/1941  Williford ............... A63G 31/00
                                                           250/221
4,997,060 A *  3/1991  Sassak ..................... B66B 9/02
                                                           182/48

(Continued)

FOREIGN PATENT DOCUMENTS

JP          10-15249 A      1/1998
JP          11-502752 A      3/1999

(Continued)

OTHER PUBLICATIONS

Korean Office Action dated Jul. 27, 2024 in Application No. 10-2022-0131038.

*Primary Examiner* — Joseph S Del Sole
(74) *Attorney, Agent, or Firm* — Sughrue Mion, PLLC

(57)          ABSTRACT

Disclosed is a gyro drop apparatus including a tower standing on and extending from an installation surface; a gondola provided to ascend and descend along the tower and boarded by users; a driving supporter configured to drive the gondola to ascend; a brake configured to decelerate the gondola so that a fall speed of the gondola can be within a normal deceleration range when the gondola is in free fall; an abrupt-fall detector configured to detect whether or not the gondola falls abruptly or unintentionally; an emergency safety unit provided below the gondola and switching over between a standby state to be ready for operation and an operating state to absorb shock of the gondola; and a controller configured to control the emergency safety unit to switch over from the standby state to the operating state when the abrupt-fall detector detects that the gondola falls abruptly or unintentionally.

4 Claims, 4 Drawing Sheets

(58) Field of Classification Search
USPC ............................. 472/131; 280/728.1–743.2
See application file for complete search history.

(56) References Cited

U.S. PATENT DOCUMENTS

| | | | |
|---|---|---|---|
| 5,964,666 A | 10/1999 | Uemura | |
| 6,062,350 A | 5/2000 | Spieldiener et al. | |
| 11,040,288 B2 * | 6/2021 | Brister .................... | A63G 7/00 |
| 11,173,409 B2 * | 11/2021 | Cohen .................... | A63G 31/00 |
| 2010/0240454 A1 * | 9/2010 | Xiao ...................... | A63G 31/16 |
| | | | 463/30 |
| 2013/0260906 A1 * | 10/2013 | Checketts .............. | A63G 31/08 |
| | | | 472/131 |

FOREIGN PATENT DOCUMENTS

| | | | |
|---|---|---|---|
| KR | 10-2018-0094642 A | 8/2018 | |
| KR | 10-2058842 B1 | 12/2019 | |

* cited by examiner

GYRO DROP APPARATUS AND METHOD OF CONTROLLING THE SAME

GOVERNMENT SUPPORT

This invention was supported by The Ministry of the Interior and Safety of Republic of Korea, National Disaster Management Research Institute (NDMI), under the Research and Development Program entitled "Technology Development for Disaster and Safety Management Support" under Grant No. NDMI-PR-2022-04-01.

CROSS-REFERENCE TO RELATED THE APPLICATION

This application is based on and claims priority under 35 U.S.C. § 119 to Korean Patent Application No. 10-2022-0131038, filed on Oct. 13, 2022 in the Korean Intellectual Property Office, the disclosure of which is incorporated by reference herein in its entirety.

BACKGROUND

Field

The disclosure relates to a gyro drop apparatus that provides a freefall experience to a user and a method of controlling the same, and particularly to a gyro drop apparatus having a structure for ensuring the safety of a user who is in free fall and a method of controlling the same.

Description of the Related Art

A gyro drop apparatus or a drop tower refers to an apparatus that lifts a gondola, into which users get, up to a height of several tens of meters along a tower standing on the ground and allows the gondola to free fall. The gondola is affected only by gravity in free fall, and its speed increases by 9.8 m/s per second due to the acceleration of gravity. For example, when the gondola of the gyro drop apparatus is lifted up to a height of 70 m and then freely falls up to a height of 35 m, the gondola has a freefall distance of 35 m, a fall time of 2.5 seconds, and a fall speed of 94 km/h. While the gondola is in free fall as described above, users who are riding the gondola experience weightlessness as if floating in the air. The gyro drop apparatus makes the gondola freely fall by a predetermined distance and then gradually decelerates the gondola through a brake so that the gondola can safely land on the ground. In this way, the gyro drop apparatus operates in the order of a lifting step of lifting the gondola, a freefall step of dropping the gondola, and a deceleration step of decelerating and finally stopping the gondola.

However, for various reasons due to the structure of the brake, deceleration may not be normally carried out in the deceleration step. When the brake does not work at all, the gondola may continue to be in free fall. When the deceleration does not reach an originally planned level even though the brake works, the gondola cannot stop before landing on the ground. In any case, the gondola cannot avoid a collision with the ground. Therefore, a problem with the brake will have a fatal effect on the safety of users who are riding the gondola.

Accordingly, a method of ensuring the safety of users who are riding the gondola is required to cope with the cases where the brake does not work normally.

SUMMARY

An aspect of the disclosure is to a gyro drop apparatus which can protect users from a shock caused by a collision between a gondola and the ground when a brake does not work normally.

According to an embodiment of the disclosure, there is provided a gyro drop apparatus including a tower standing on and extending from an installation surface; a gondola provided to ascend and descend along the tower and boarded by users; a driving supporter configured to drive the gondola to ascend; a brake configured to decelerate the gondola so that a fall speed of the gondola can be within a normal deceleration range when the gondola is in free fall; an abrupt-fall detector configured to detect whether or not the gondola falls abruptly or unintentionally; an emergency safety unit provided below the gondola and switching over between a standby state to be ready for operation and an operating state to absorb shock of the gondola; and a controller configured to control the emergency safety unit to switch over from the standby state to the operating state when the abrupt-fall detector detects that the gondola falls abruptly or unintentionally. Thus, the safety of users riding the gondola is ensured in an emergency where the brake does not work normally.

Further, the emergency safety unit may include at least one among an airbag, a hydraulic damper, and a spring. Thus, various shock-absorbing structures may be used to improve the safety of users.

Further, the emergency safety unit may include a first shock-absorbing member disposed on the installation surface, and a second shock-absorbing member provided on a bottom of the gondola facing the installation surface and located at an alternate position not to interfere with the first shock-absorbing member. Thus, the safety of users is improved.

Further, the abrupt-fall detector may include a speedometer to detect at least one of the speed and acceleration of the gondola, and the controller may identify that the gondola falls abruptly or unintentionally when the fall speed of the gondola is out of a normal deceleration range based on the at least one of the detected speed and acceleration of the gondola. Thus, it is easy to identify whether or not the gondola falls abruptly or unintentionally.

According to an embodiment of the disclosure, there is provided a method of controlling a gyro drop apparatus, including: driving a gondola boarded by users to ascend along a tower standing on and extending from an installation surface; allowing the gondola to be in free fall; detecting whether or not the gondola falls abruptly or unintentionally, after a brake starts decelerating the gondola so that a fall speed of the gondola can be within a normal deceleration range; and switching over an emergency safety unit provided below the gondola from a standby state to be ready for operation to an operating state to absorb shock of the gondola, when it is detected that the gondola falls abruptly or unintentionally. Thus, the safety of users riding the gondola is ensured in an emergency where the brake does not work normally.

BRIEF DESCRIPTION OF THE DRAWINGS

The above and/or the aspects will become apparent and more readily appreciated from the following description of exemplary embodiments, taken in conjunction with the accompanying drawings, in which.

DETAILED DESCRIPTION OF EXEMPLARY EMBODIMENTS

Below, embodiments will be described in detail with reference to accompanying drawings. Further, the embodiments described with reference to the accompanying drawings are not exclusive to each other unless otherwise mentioned, and a plurality of embodiments may be selectively combined within one apparatus. The combination of these plural embodiments may be discretionally selected and applied to realize the present inventive concept by a person having an ordinary skill in the art.

In the description of the embodiments, an ordinal number used in terms such as a first element, a second element, etc. is employed for describing variety of elements, and the terms are used for distinguishing between one element and another element. Therefore, the meanings of the elements are not limited by the terms, and the terms are also used just for explaining the corresponding embodiment without limiting the disclosure.

Further, a term "at least one" among a plurality of elements in the disclosure represents not only all the elements but also each one of the elements, which excludes the other elements or all combinations of the elements.

Figure 1:
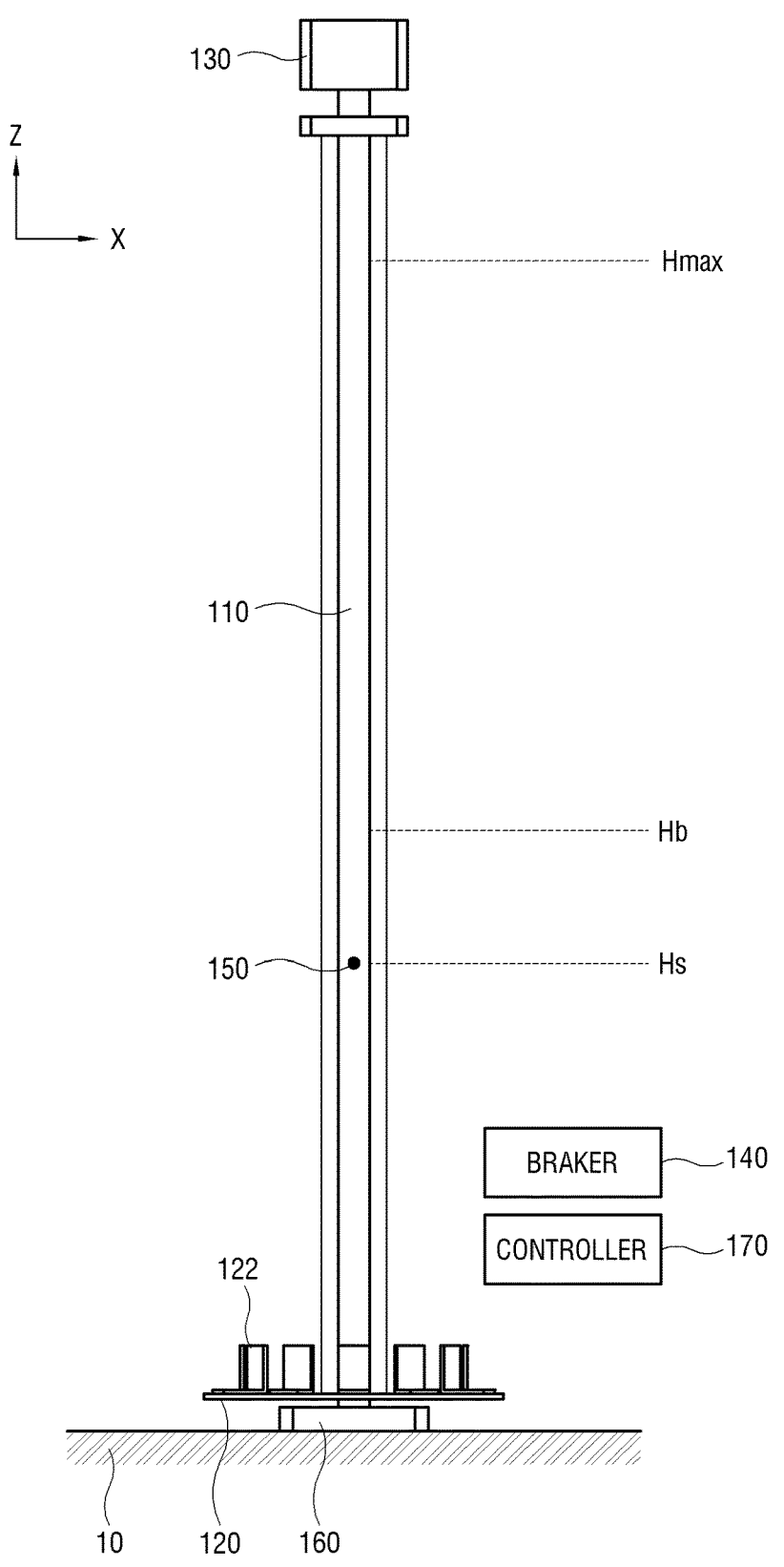
FIG. 1 illustrates an example of a gyro drop apparatus.

FIG. 1 illustrates an example of a gyro drop apparatus.

Figure 2:
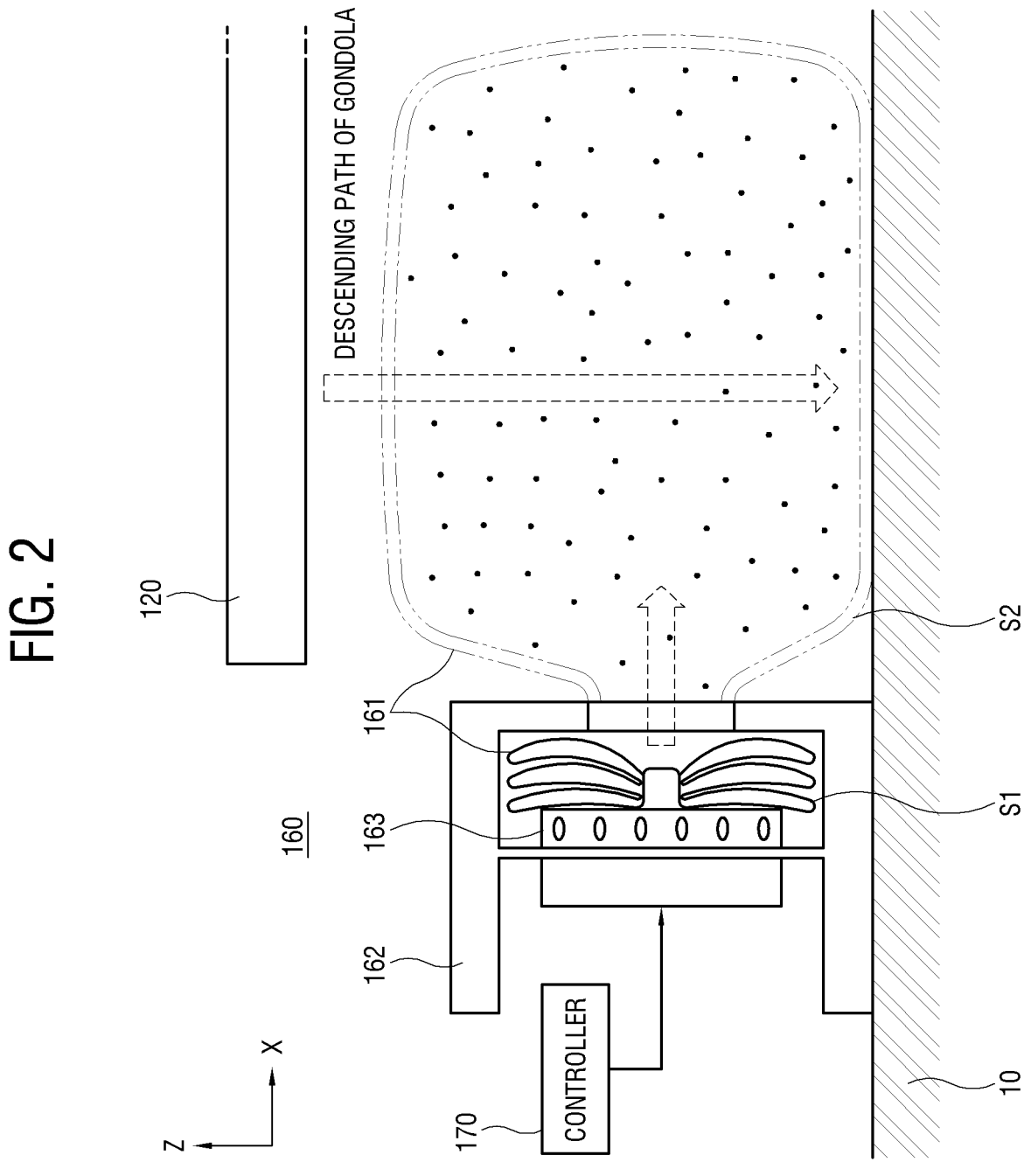
FIG. 2 illustrates an example of an emergency safety unit.

FIG. 2 illustrates an example of an emergency safety unit.

As shown in FIGS. 1 and 2, a gyro drop apparatus 100 refers to a ride that provides a freefall experience to a plurality of users, and makes the users ascend up to a height of, for example, about 70 m and then freely fall a distance of 30 m or more. While the users are in free fall through the gyro drop apparatus 100, air under the users increases in density to form high pressure, but air over the users decreases in density to form low pressure, thereby allowing the users to experience a kind of weightlessness. After the freefall by a predetermined distance, the gyro drop apparatus 100 decelerates until the users who are descending by the acceleration of gravity stop so that they can safely land on the ground. Below, the configuration of the gyro drop apparatus 100 will be described.

The gyro drop apparatus 100 includes a tower 110. The tower 110 refers to a pillar structure standing on and extending from an installation surface 10 (for example, the ground), and is implemented as a substantial material, e.g., a concrete structure or the like to support the overall configuration of the gyro drop apparatus 100. The tower 110 is extended in the Z direction of the accompanying drawings, i.e., in a direction perpendicular to the installation surface 10 so as to guide a gondola 120 (to be described later) to ascend and descend.

The gyro drop apparatus 100 includes the gondola 120. The gondola 120 includes a plate generally shaped like a disc, or a frame shaped like a ring. The gondola 120 is formed with a hole at the center thereof, through which the tower 110 passes, and is provided to ascend in the z direction or descend in the −Z direction along the tower 110. The gondola 120 is provided with a seat 122 on the top thereof oriented in the Z direction so that a user can sit, and the seat 122 includes a safety bar or the like additional unit for protecting a seated user.

The gyro drop apparatus 100 includes a driving supporter 130. The driving supporter 130 drives the gondola 120 to ascend up to a preset height Hmax. Further, the driving supporter 130 may selectively lock or unlock the gondola 120. When the gondola 120 is locked, the driving supporter 130 may support the gondola 120, which is located at a predetermined height along the tower 110, not to fall abruptly or unintentionally while maintaining that height. When the gondola 120 is unlocked, the driving supporter 130 allows the gondola 120 to fall freely in the −Z direction. The driving supporter 130 locks the gondola 120 while the gondola 120 is ascending from an initial position (in other words, where the gondola 120 is located on the installation surface 10 so as to be boarded by users) up to the height Hmax, and then unlocks the gondola 120 so that the gondola 120 can be in free fall.

The driving supporter 130 may be designed to have various structures, for example, a hoist structure used in an elevator or the like. The driving supporter 130 having the hoist structure includes a motor generating a driving force, a drum or lifting wheel provided to wind or unwind a chain by the driving force, and a lifting hook provided at the end of the chain and selectively locked to or unlocked from the gondola 120. As the chain is wound around the drum or lifting wheel by the driving force of the motor while the lifting hook is locked to the gondola 120, the driving supporter 130 drives the gondola 120 to ascend. When the motor stops and the lifting hook is unlocked, the gondola 120 is in free fall due to gravity. After the freefall, the lifting hook is locked again to the gondola 120 located at the initial position on the installation surface 10, thereby allowing the driving supporter 130 to repeat the same process.

The gyro drop apparatus 100 includes a brake 140. The brake 140 starts decelerating the gondola 120 from a point in time when the gondola 120 reaches a height Hb lower than the height Hmax. The gondola 120 that freely falls from the height Hmax accelerates due to the acceleration of gravity. Stopping the accelerating gondola 120 in an excessively short period of time may cause the gyro drop apparatus 100 and the users who are riding the gondola 120 to be immensely shocked. Therefore, the brake 140 gradually increases the level of deceleration after the gondola 120 passes the height Hb, and stops the gondola 120 when the gondola 120 reaches the installation surface 10.

The brake 140 may be designed to have various braking structures, for example, an eddy current braking structure. The eddy current braking structure requires neither a driving force nor a command or signal for working. The brake 140 having the eddy current braking structure includes a plurality of horseshoe permanent magnets arranged in the gondola 120 and facing the tower 110, and a plurality of iron plates extending upwards from the installation surface 10 along the tower 110 and disposed to pass between the N and S poles of the permanent magnets.

When the permanent magnets of the gondola 120 pass the iron plates of the tower 110 at a high speed as the gondola 120 is in free fall, a change in magnetic flux occurs in the iron plates. This change in magnetic flux causes a current to flow in the iron plates by electromagnetic induction, and this current inside the magnetic field of the permanent magnets generates the Lorentz force. The Lorentz force is exerted on the tower 110 in which the current is flowing, but the tower 110 is stationary on the installation surface 10. For this reason, the gondola 120 is urged upwards by the reaction of the Lorentz force, and thus decelerated. The number of iron plates passing between the permanent magnets of the gondola 120 is designed to increase stepwise as the gondola 120 descends. Therefore, the level of deceleration applied to the gondola 120 increases enough to stop the gondola 120.

The gyro drop apparatus 100 includes an abrupt-fall detector 150. The abrupt-fall detector 150 is provided to detect whether the gondola 120 falls abruptly or unintentionally, and may be implemented by various sensors. For example, the abrupt-fall detector 150 includes a speedometer for detecting the speed of the gondola 120, or an accelerometer for detecting acceleration. The abrupt or unintentional falling of the gondola 120 means that the gondola 120 is descending not within but beyond a normal deceleration range after the brake 140 starts braking. The normal deceleration range refers to the levels of deceleration corresponding to heights, by which the gondola 120 is allowed to finally safely land on the installation surface 10, and is designated in advance through various simulations and experiments. Therefore, the abrupt-fall detector 150 is installed not between the height Hmax and the height Hb, but at the height lower than the height Hb. The abrupt-fall detector 150 may include one accelerometer installed at a preset height Hs lower than the height Hb. Alternatively, the abrupt-fall detector 150 may include a plurality of speedometers respectively installed at a plurality of different heights lower than the height Hb.

Meanwhile, the abrupt-fall detector 150 may be designed to be installed in the gondola 120. In this case, it is identified by a controller 170 whether the speed or acceleration of the gondola 120 corresponding to the height is within a normal range, in which the height of the gondola 120 may be identified by a separate sensor. Alternatively, it may be identified by the controller 170 whether the speed or acceleration of the gondola 120 corresponding to falling time is within the normal range.

The gyro drop apparatus 100 includes an emergency safety unit 160. The emergency safety unit 160 is provided below the gondola 120, for example, in at least one of the bottom of the gondola 120 and the installation surface which are facing each other (FIG. 1 shows that the emergency safety unit 160 is installed in the installation surface 10), and absorbs a shock generated when the gondola 120 falling abruptly or unintentionally crashes into the installation surface 10. The emergency safety unit 160 may be designed to have various structures, and is provided to switch over between a standby state S1 where the emergency safety unit 160 is ready for operation and an operating state S2 where the emergency safety unit 160 is capable of absorbing the shock generated when the gondola 120 falling abruptly or unintentionally crashes into the installation surface 10. The emergency safety unit 160 is initially in the standby state S1, and switched over to the operating state S2 in response to a switching instruction of the controller 170.

For example, the emergency safety unit 160 shown in FIG. 1 may include an airbag 161 provided on the installation surface 10 as shown in FIG. 2. In this case, the emergency safety unit 160 may further include a casing 162 for accommodating the airbag 161, and an inflation device 163 for inflating the airbag 161. In the standby state S1, the airbag 161 is accommodated in the casing 162. In the standby state S1, the airbag 161 is compressed not to interfere with a descending path of the gondola 120 so that the gondola 120 normally decelerating and descending can land on the installation surface 10. When a control signal for an operating instruction is received from the controller 170, the inflation device 163 fills the airbag 161 accommodated in the casing 162 with nitrogen gas for a short period of time, and thus the airbag 161 is inflated coming out of the casing 162, so that the emergency safety unit 160 can be switched over to the operating state S2. In the operating state S2, the airbag 161 is disposed on the installation surface 10 to interfere with the descending path of the gondola 120 falling abruptly or unintentionally, thereby absorbing the shock and protecting users riding the gondola 120.

According to an embodiment, the airbag 161 is inflated in a direction parallel with the installation surface 10, in other words, in the X direction. However, this is merely an example, and does not limit the operation of the airbag 161. For example, the airbag 161 of the emergency safety unit 160 may be inflated on the installation surface 10 in the Z direction, or the airbag 161 may be provided on the bottom of the gondola 120 and inflated in the −Z direction.

Besides, the emergency safety unit 160 may be implemented to have various structures, which will be described later.

The gyro drop apparatus 100 includes the controller 170. The controller 170 includes a circuitry including various hardware components such as a processor, a microcontroller, a central processing unit (CPU), a chipset, circuit wiring, and a printed circuit board. The controller 170 may further include a user input interface for receiving a user's input, and a display for displaying the operating state of the gyro drop apparatus 100. When an operation start signal for the gyro drop apparatus 100 is received through the user input interface, the controller 170 controls the driving supporter 130 to lock and drive the gondola 120 so that the gondola 120 can ascend from the installation surface 10 up to the height Hmax. Further, the controller 170 controls the driving supporter 130 to unlock and drive the gondola 120 so that the gondola 120 can freely fall from the height Hmax.

The controller 170 monitors the descending state of the gondola 120 through the abrupt-fall detector 150. Based on detection results of the abrupt-fall detector 150, the controller 170 identifies whether the gondola 120 is descending by normal deceleration or is abruptly or unintentionally falling. When it is identified that the gondola 120 is normally decelerating, the controller 170 does not perform any special operation. On the other hand, it is identified that the gondola 120 is abruptly or unintentionally falling, the controller 170 transmits a control signal to the emergency safety unit 160 so that the emergency safety unit 160 can be switched over from the standby state S1 to the operating state S2.

Below, a method of controlling the gyro drop apparatus 100 will be described.

Figure 3:
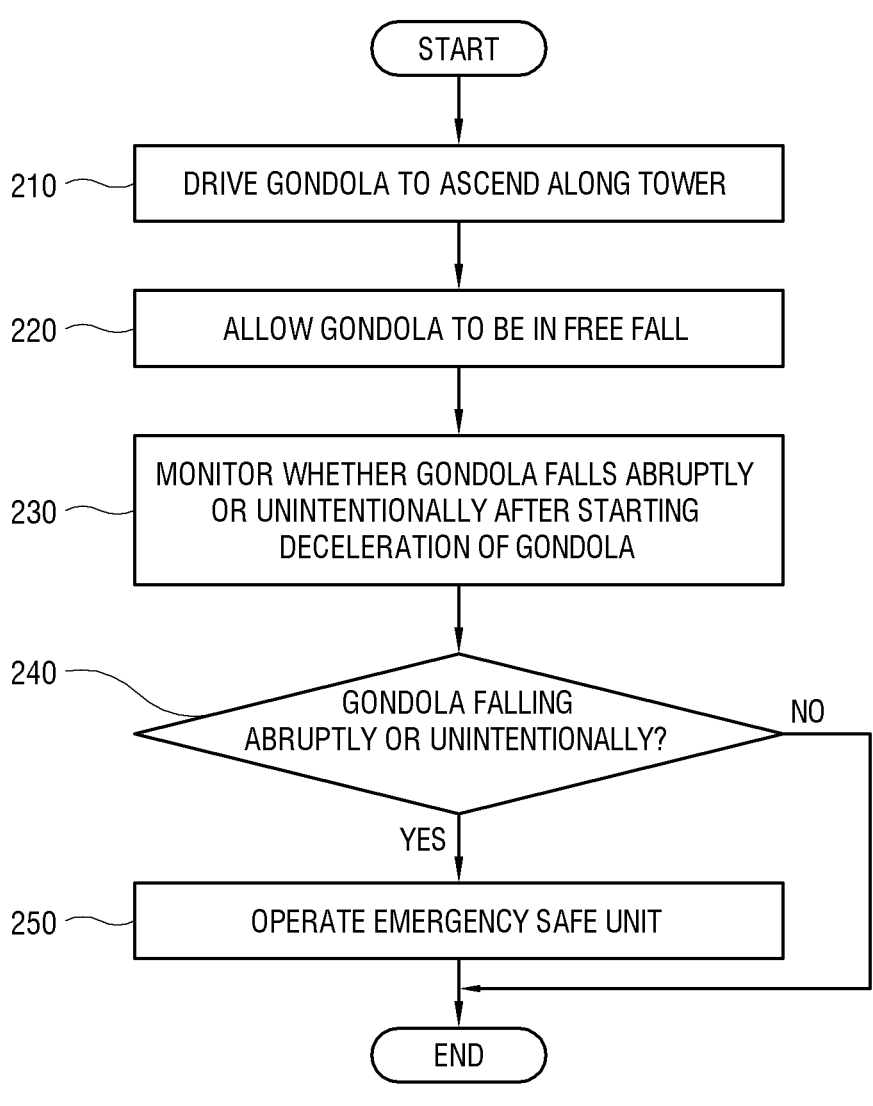
FIG. 3 is a flowchart showing a method of controlling a gyro drop apparatus.

FIG. 3 is a flowchart showing a method of controlling a gyro drop apparatus.

As shown in FIGS. 1 to 3, the following operations are performed by the controller 170 of the gyro drop apparatus 100.

At operation 210 the gyro drop apparatus 100 makes the gondola 120 ascend along the tower 110 when the gondola 120 at the initial position is completely boarded by users. The gondola 120 is locked to the driving supporter 130 at the initial position, and therefore maintained at an ascended height without descending until reaching a preset upper height limit Hmax.

At operation 220 the gyro drop apparatus 100 allows the gondola 120 to be in free fall. When the gondola 120 is located at the height Hmax, the gyro drop apparatus 100 unlocks the gondola 120 from the driving supporter 130.

At operation 230 the gyro drop apparatus 100 monitors whether the gondola 120 falls abruptly or unintentionally after starting deceleration. The gondola 120 freely falls from the height Hmax to the height Hb, and is gradually decelerated from the height Hb by the brake 140. At a preset point in time after the deceleration is started, the gyro drop apparatus 100 monitors whether the gondola 120 falls abruptly or unintentionally or is normally decelerating and descending.

At operation 240 the gyro drop apparatus 100 identifies whether or not the gondola 120 falls abruptly or unintentionally. The gyro drop apparatus 100 identifies that the gondola 120 does not fall abruptly or unintentionally when the descending speed of the gondola 120 detected at the height Hs is within the normal deceleration range, but identifies that the gondola 120 is abruptly or unintentionally falling when the descending speed is beyond the normal deceleration range. For example, the gyro drop apparatus 100 may identify that the gondola 120 is falling when the descending speed of the gondola 120 detected at the height Hs is higher than a preset first value, or identify that the gondola 120 is abruptly or unintentionally falling when the level of deceleration of the descending speed of the gondola 120 detected at the height Hs is lower than a preset second value.

When it is identified in the operation 240 that the gondola 120 is abruptly or unintentionally falling (see "YES" in FIG. 3), the gyro drop apparatus 100 operates the emergency safety unit 160 at operation 250. In other words, the gyro drop apparatus 100 switches over the emergency safety unit 160 from the standby state S1 to the operating state S2, thereby absorbing and buffering the shock of the gondola 120 falling abruptly or unintentionally. On the other hand, when it is identified in the operation 240 that the gondola 120 is not falling abruptly or unintentionally (see "NO" in FIG. 3), the gyro drop apparatus 100 does not perform additional operation and allows the gondola 120 to descend and stop to the initial position.

Thus, when the brake 140 does not perform normal braking, the gyro drop apparatus 100 operates the emergency safety unit 160 to ensure the safety of users riding the gondola 120.

Below, various examples of the emergency safety unit 160 will be described.

Figure 4:
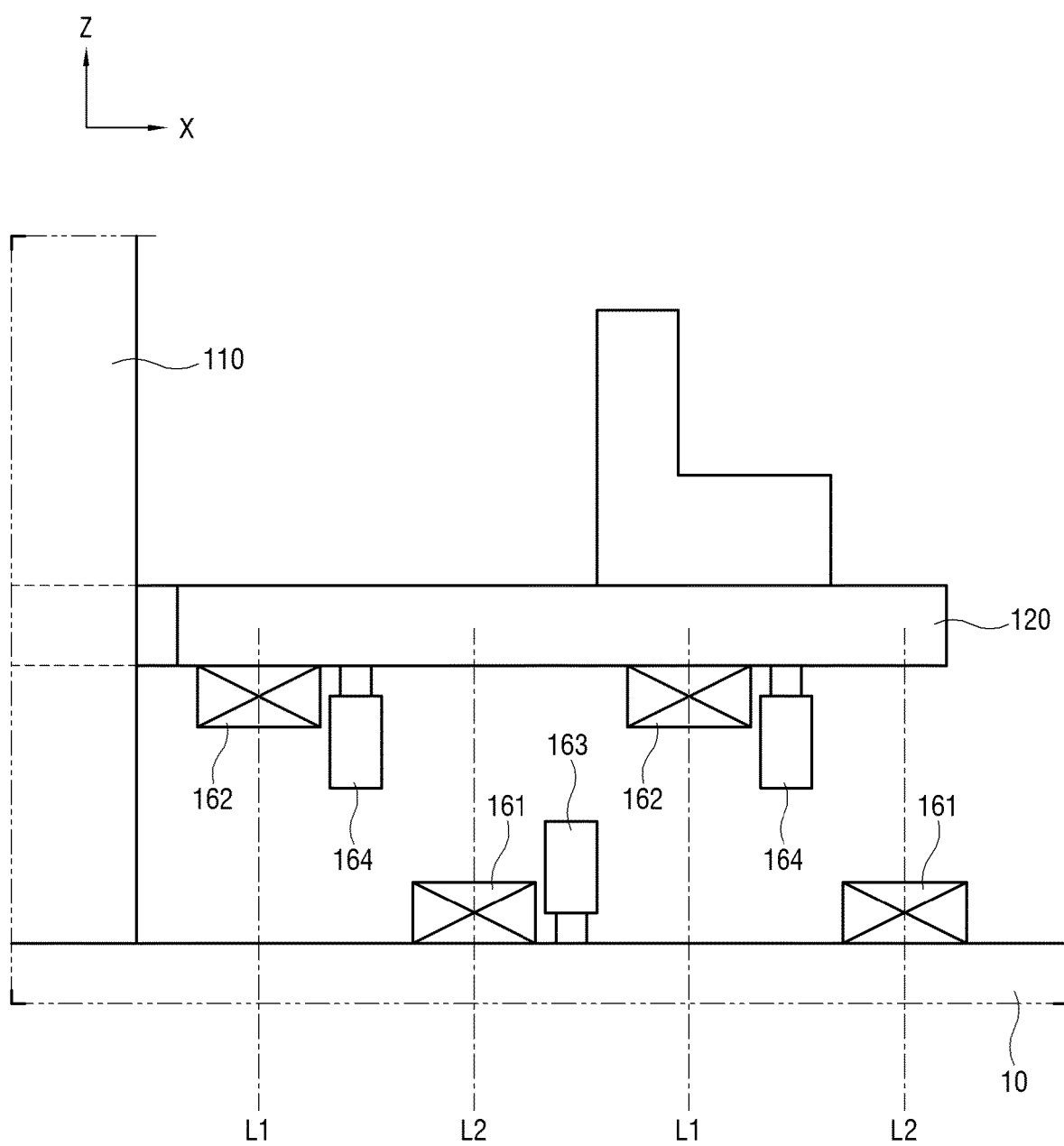
FIG. 4 illustrates an example of implementing an emergency safety unit.

FIG. 4 illustrates an example of implementing an emergency safety unit.

As shown in FIGS. 1 to 4, the emergency safety unit 160 includes one or more types of shock-absorbing members 161, 162, 163 and 164 to absorb a shock. For example, the emergency safety unit 160 includes at least one of a first shock-absorbing member 161 installed on the installation surface 10, and a second shock-absorbing member 162 installed on the bottom of the gondola 120. Alternatively, the emergency safety unit 160 may be designed to further include at least one of a third shock-absorbing member 163 installed on the installation surface 10, and a fourth shock-absorbing member 164 installed on the bottom of the gondola 120. According to an embodiment, it will be described that four shock-absorbing members 161, 162, 163 and 164 are installed. However, only one type of shock-absorbing member may be installed, or two or more types of shock-absorbing members may be selectively installed.

Further, according to an embodiment, it will be described that different types of shock-absorbing members 161, 162, 163 and 164 (e.g., different in operation from one another) are installed together. In this case, even when one type of shock-absorbing members are not switchable over to the operating state S2, at least one among the other types of shock-absorbing members is switchable over to the operating state S2, thereby increasing the safety. Alternatively, only one type of shock-absorbing members of among different types of shock-absorbing members 161, 162, 163 and 164 may be designed to be installed. The first shock-absorbing member 161 and the second shock-absorbing member 162 include the airbags 161, respectively. The structure of the airbag 161 is the same as described in the foregoing embodiment.

Only one type of shock-absorbing members between the first shock-absorbing members 161 and the second shock-absorbing members 162 may be installed. When both the first shock-absorbing members 161 and the second shock-absorbing members 162 are installed, the locations L1 on the installation surface 10 where the first shock-absorbing members 161 are disposed are alternately positioned not to overlap with the location L2 on the bottom of the gondola 120 where the second shock-absorbing members 162 are disposed. This is to prevent the first shock-absorbing member 161 and the second shock-absorbing member 162 from interfering with each other in the operating state S2. According to an embodiment, the locations L1 and L2 are alternately disposed along the radial direction of the gondola 120. Alternatively, the locations L1 and L2 may be alternately disposed along the circumferential direction of the gondola 120.

The third shock-absorbing member 163 and the fourth shock-absorbing member 164 include hydraulic dampers. The hydraulic damper refers to an element that offsets shock and vibration while the kinetic energy of movable parts is converted into thermal energy. The hydraulic damper has a structure in which a piston rod provided with an orifice moves inside a cylinder filled with oil. The oil in the cylinder moves between the upper and lower sides of the cylinder through the orifice due to pressure difference in the cylinder when the piston rod moves. In this process, resistance is generated to damper the kinetic energy, thereby absorbing the shock. Here, a coil spring may be added to the hydraulic damper, thereby improving shock-absorbing performance.

The third shock-absorbing member 163 and the fourth shock-absorbing member 164 are located at first rotated positions folded in a direction perpendicular to the Z axial line, i.e., a direction parallel to the bottom of the gondola 120 or the installation surface 10 in the standby state S1. Therefore, there is no interference when the gondola 120 is in the initial position. The third shock-absorbing member 163 and the fourth shock-absorbing member 164 are located at second rotated positions extended in a direction parallel to the Z axial line, i.e., a direction perpendicular to the bottom of the gondola 120 or the installation surface 10 in the operating state S2, thereby absorbing a shock applied in the Z direction. To this end, the gyro drop apparatus 100 further includes an actuator to rotate the third shock-absorbing member 163 or the fourth shock-absorbing member 164 between the first rotated position and the second rotated position by the controller 170. Like the first shock-absorbing member 161 and the second shock-absorbing member 162 described above, when the third shock-absorbing member 163 and the fourth shock-absorbing member 164 are installed together, the third shock-absorbing member 163 and the fourth shock-absorbing member 164 are alternately disposed to each other.

Besides the foregoing examples, the emergency safety unit 160 may have various shock-absorbing structures. For example, the emergency safety unit 160 may include a spring. Alternatively, the emergency safety unit 160 may include an air injector that explosively injects high-pressure air from the installation surface 10 toward the gondola 120 or from the gondola 120 toward the installation surface 10. The emergency safety unit 160 includes an air tank that stores high-pressure air and injects the air from the air tank to lower the abrupt or unintentional fall speed of the gondola 120 when switched over to the operating state S2. Alternatively, the emergency safety unit 160 may include electric circuits respectively provided in the installation surface 10 and the gondola 120 and corresponding to each other so that the installation surface 10 and the gondola 120 can repel each other when electric power is applied thereto. The controller 170 applies electric power to the electric circuits when switched over to the operating state S2 so that a repulsive force can be exerted between the installation surface 10 and the gondola 120.

According to the disclosure, a gyro drop apparatus can protect users from a shock caused when a brake does not work normally and therefore a gondola crashes into the ground.

What is claimed is:

1. A gyro drop apparatus comprising:
a tower standing on and extending from an installation surface;
a gondola provided to ascend and descend along the tower and boarded by users;
a driving supporter configured to drive the gondola to ascend;
a brake configured to decelerate the gondola so that a fall speed of the gondola can be within a normal deceleration range upon a freefall of the gondola;
an abrupt-fall detector configured to detect whether or not the gondola falls abruptly or unintentionally;
an emergency safety unit provided below the gondola and switching over between a standby state to be ready for operation and an operating state to absorb shock of the gondola; and
a controller configured to control the emergency safety unit to switch over from the standby state to the operating state upon the abrupt-fall detector detecting that the gondola falls abruptly or unintentionally,
wherein the emergency safety unit comprises:
a first shock-absorbing member disposed on the installation surface,
a second shock-absorbing member provided on a bottom of the gondola facing the installation surface and located at an alternate position not to interfere with the first shock-absorbing member, the first shock-absorbing member and the second shock-absorbing member including airbags,
a third shock-absorbing member installed on the installation surface, and
a fourth shock-absorbing member provided on the bottom of the gondola and located at an alternate position not to interfere with the third shock-absorbing member, the third shock-absorbing member and the fourth shock-absorbing member including hydraulic dampers.

2. The gyro drop apparatus of claim 1, wherein the emergency safety unit comprises at least one among an airbag, a hydraulic damper, and a spring.

3. The gyro drop apparatus of claim 1, wherein the abrupt-fall detector comprises a speedometer to detect at least one of the speed and acceleration of the gondola, and
the controller identifies that the gondola falls abruptly or unintentionally, upon the fall speed of the gondola being out of a normal deceleration range based on the at least one of the detected speed and acceleration of the gondola.

4. A method of controlling a gyro drop apparatus, comprising:
driving a gondola boarded by users to ascend along a tower standing on and extending from an installation surface;
allowing the gondola to be in free fall;
detecting whether or not the gondola falls abruptly or unintentionally, after a brake starts decelerating the gondola so that a fall speed of the gondola can be within a normal deceleration range; and
switching over an emergency safety unit provided below the gondola from a standby state to be ready for operation to an operating state to absorb shock of the gondola, upon detecting that the gondola falls abruptly or unintentionally,
wherein the emergency safety unit comprises:
a first shock-absorbing member disposed on the installation surface,
a second shock-absorbing member provided on a bottom of the gondola facing the installation surface and located at an alternate position not to interfere with the first shock-absorbing member, the first shock-absorbing member and the second shock-absorbing member including airbags,
a third shock-absorbing member installed on the installation surface, and
a fourth shock-absorbing member provided on the bottom of the gondola and located at an alternate position not to interfere with the third shock-absorbing member, the third shock-absorbing member and the fourth shock-absorbing member including hydraulic dampers.

* * * * *